United States Patent [19]

Kumar et al.

[11] Patent Number: 4,472,178
[45] Date of Patent: Sep. 18, 1984

[54] ADSORPTIVE PROCESS FOR THE REMOVAL OF CARBON DIOXIDE FROM A GAS

[75] Inventors: Ravi Kumar, Allentown; Shivaji Sircar, Wescosville; Wilbur C. Kratz, Macungie, all of Pa.

[73] Assignee: Air Products and Chemicals, Inc., Allentown, Pa.

[21] Appl. No.: 511,119

[22] Filed: Jul. 5, 1983

[51] Int. Cl.³ ............................................. B01D 53/04
[52] U.S. Cl. ........................................... 55/25; 55/28; 55/58; 55/62; 55/75
[58] Field of Search .................... 55/28, 31, 33, 35, 58, 55/62, 68, 75, 25, 26

[56] References Cited

U.S. PATENT DOCUMENTS

| | | | |
|---|---|---|---|
| 2,661,808 | 12/1953 | Kahle | 55/74 |
| 2,675,089 | 4/1954 | Kahle | 55/62 |
| 2,790,505 | 4/1957 | Dow | 55/62 X |
| 2,944,627 | 7/1960 | Skarstrom | 55/25 |
| 3,206,918 | 9/1965 | Robinson | 55/179 |
| 3,230,689 | 1/1966 | Hussman | 55/28 |
| 3,355,859 | 12/1967 | Karwat | 55/31 X |
| 3,674,429 | 7/1972 | Collins | 55/31 X |
| 3,733,775 | 5/1973 | Barrere, Jr. | 55/28 |
| 3,850,592 | 11/1974 | Huffman | 55/62 X |
| 3,967,464 | 7/1976 | Cormier et al. | 55/62 X |
| 4,030,896 | 6/1977 | Wimber et al. | 55/62 X |
| 4,093,429 | 6/1978 | Siegler et al. | 55/58 |
| 4,165,972 | 8/1979 | Iles et al. | 55/28 |
| 4,233,038 | 11/1980 | Tao | 55/33 |
| 4,249,915 | 2/1981 | Sircar et al. | 55/26 |
| 4,264,340 | 4/1981 | Sircar et al. | 55/75 X |
| 4,324,566 | 4/1982 | Jacob et al. | 55/28 |
| 4,329,158 | 5/1982 | Sircar | 55/75 X |
| 4,336,159 | 6/1982 | Winter | 55/62 X |

Primary Examiner—Robert H. Spitzer
Attorney, Agent, or Firm—Geoffrey L. Chase; E. Eugene Innis; James C. Simmons

[57] ABSTRACT

A process is set forth for the removal of carbon dioxide from air in an adsorption bed wherein the regeneration energy is reduced by the use of a heat recuperator and a purge sequence which avoids the removal of heat from the adsorption bed during regeneration.

8 Claims, 7 Drawing Figures

ADSORPTIVE PROCESS FOR THE REMOVAL OF CARBON DIOXIDE FROM A GAS

TECHNICAL FIELD

The present invention is directed to the removal of carbon dioxide from a gas. Particularly, the present invention is directed to the energy efficient removal of carbon dioxide from air in an adsorption bed. The invention is further directed to an improved regeneration scheme for such an adsorption bed. The invention is specifically applicable to the processing of air as a feed stream to an air separation device.

BACKGROUND OF THE PRIOR ART

Air separation technology has been practiced in the industrial world with the major goals being the isolation of the greatest proportion of air components, such as nitrogen, oxygen and argon, as a given system will allow. During the past decade, as energy has become a larger factor in all industrial processes, the efficiency of any given air separation technique has become of greater significance. Various improved techniques have been developed for efficiently separating air depending upon the particular product volume required and a determination as to whether only a sole product will be recovered or a number of products, such as nitrogen and oxygen, will be recovered. However, a common requirement of most air separation procedures and particularly cryogenic and swing adsorption techniques, has been the requirement that water, hydrocarbons and carbon dioxide be removed from the feed air stream prior to liquefaction or selective adsorption. This latter problem has been handled by the prior art in several ways.

In U.S. Pat. No. 2,944,627 a process for separating gas mixtures is disclosed wherein an object of the patent is to remove water in an initial adsorption bed. The patent discloses that a pulse or wave front of water laden adsorbent occurs in the bed during the adsorption cycle.

In U.S. Pat. No. 3,206,918, the drying of air in switching adsorption beds is set forth, wherein the heat of vacuum pumping during regeneration is supplied to the regenerating bed in order to assist the regeneration. The heat is not retained for subsequent use.

U.S. Pat. No. 3,230,689 describes a method for drying gases in which the heat of adsorption is recovered and is utilized to heat a regeneration gas for the desorption of an adsorption bed which is not on-line. The heated regeneration gas is allowed to exit the feed end of the adsorption bed being regenerated.

In U.S. Pat. No. 3,733,775, a method is set forth for regenerating an adsorption bed by the passage of a heated gas co-current to the feed gas through the regenerating adsorption bed. The beds are subsequently cooled prior to going back on-line.

U.S. Pat. No. 4,093,429 is directed to an adsorption process for gas separation wherein the zones of various adsorbates in the bed and their manner of travel through the bed is set forth.

In U.S. Pat. No. 4,165,972, a gas separation system is set forth wherein a heated regeneration gas is passed through a desorbing bed to assist in the desorption. The heated gas, after exiting the desorbing bed is then cooled in order to be utilized to cool a subsequent bed before that bed goes on-line in the adsorption sequence.

U.S. Pat. No. 4,233,038 discloses a gas separation system in which a water and carbon dioxide adsorption bed is set forth. In regeneration, a heated gas passes countercurrently through the water adsorption zone and then a cooled regeneration gas is passed co-currently through both the heated water adsorption zone and the carbon dioxide adsorption zone. A thermal zone from the heated water adsorption zone is carried through the carbon dioxide adsorption zone in order to regenerate the latter zone. However, the heated gas is then exhausted without conservation.

In U.S. Pat. No. 4,249,915, a process is disclosed for the removal of water and carbon dioxide prior to an air separation process, wherein the water is removed in a pressure swing cycle and the carbon dioxide is removed in a temperature swing cycle.

U.S. Pat. No. 4,324,566 discloses an adsorption scheme for the separation of gas components wherein the adsorption is performed with a variable temperature feed gas which varies between a predetermined high temperature and a predetermined low temperature in order to perform a selective adsorption. The prior art attempts to perform the removal of carbon dioxide from a gas stream preparatory to the further separation of the gas stream have various drawbacks relating to the energy efficiency of the adsorption and most particularly the regeneration of the adsorption beds utilized in removing carbon dioxide from the feed gas stream. The prior art generally fails to conserve the heat utilized for a particular bed regeneration and requires a cooling sequence in order to return a regenerated bed to on-line conditions. These drawbacks require additional energy input, which input is unnecessary with the improvements of the present invention as set forth below.

BRIEF SUMMARY OF THE INVENTION

The present invention is a process for removing carbon dioxide from a gas stream in an adsorption bed by a temperature swing adsorption sequence comprising flowing a water-depleted gas feed stream containing carbon dioxide through an adsorption bed to selectively adsorb carbon dioxide wherein the improvement in the process comprises passing the carbon dioxide-depleted gas product of the bed through a recuperator to retain heat from said adsorption bed, bypassing the flow of carbon dioxide-depleted gas product around said recuperator after the gas reaches a predetermined lower temperature level but while continuing the adsorption, discontinuing the flow of water-depleted feed gas through said bed when the gas product of said bed reaches a predetermined level of carbon dioxide, reducing the pressure of the bed and initiating the purging of the bed countercurrently with a heated water and carbon dioxide-depleted purge gas which is heated to an elevated temperature by externally supplied heat and recovered heat until a thermal zone exists in said bed, continuing the purge of the adsorbent bed without externally supplied heat until the thermal zone in said bed is approximately at the feed end of the bed, discontinuing the flow of purge gas and repressurizing the bed countercurrently with water and carbon dioxide-depleted gas until the bed reaches a preset pressure level, such that the adsorption cycle can be initiated again.

Preferably the recuperator section of the carbon dioxide adsorption bed is an integral part of the downstream portion of said bed. The recuperator would contain a high heat capacity particulate material, such as particulate metal, for example particulate copper.

Alternately, the recuperator can be a separate bed of high heat capacity material which is downstream from the carbon dioxide adsorbing bed. In this embodiment, the recuperator may be utilized to service several distinct carbon dioxide adsorbing beds which are connected in parallel but which are on-line individually in sequence.

DETAILED DESCRIPTION OF THE INVENTION

In traditional systems for the utilization of atmospheric air, such as air separation, it is necessary to remove various impurities from the feed air stream in order to maintain the air treatment equipment in running order. Specifically, it is necessary to remove water and carbon dioxide from feed air streams, particularly when the air stream will be significantly cooled, as in cryogenic distillations. If the air stream is not cleansed of water and carbon dioxide, when the air is reduced in temperature significantly, the water and carbon dioxide will freeze out of the air stream and clog various apparatus of the process equipment, most significantly the heat exchangers. In the past, reversing heat exchangers or adsorbent beds have been utilized to pre-treat an air feed stream to remove these components.

The reduction in the energy requirements of air pre-treatment stages has been addressed successfully, as in U.S. Pat. No. 4,249,915, commonly assigned, wherein the removal of water from an air feed stream is performed in a pressure swing adsorption mode in order to eliminate the energy intensive regeneration necessary in the prior art practice of adsorbing water in a temperature swing mode. This patent discloses that after the water is removed from the feed air stream in a pressure swing mode, the carbon dioxide can then be removed by adsorption in a temperature swing mode. This combination of a pressure swing adsorption for water removal and a temperature swing adsorption for carbon dioxide removal has provided an energy savings of approximately 50% over traditional clean-up systems for air feed streams. The present invention is an improvement on the process of U.S. Pat. No. 4,249,915 and this patent is hereby incorporated by reference for the disclosure of the present invention.

The present invention comprises an improvement in the regeneration of the carbon dioxide temperature swing adsorption stage of a gas feed stream clean-up process. The present invention reduces the amount of external heat necessary for the regeneration of the carbon dioxide adsorbing bed. This reduction is achieved by the utilization of a recuperator to retain the heat used in regeneration and the heat of adsorption which occurs during an adsorption cycle. In addition, the heat utilized for regeneration is not allowed to pass out of the regenerating bed to a significant extent during the regeneration cycle in part because of the elimination of a cooling step in the bed regeneration. Any minor amount of heat which is passed out of the carbon dioxide adsorption bed during regeneration is recovered in a heat exchanger wherein the heat is reutilized in a regeneration cycle. These systems provide recovered heat for the purge gas during regeneration.

The invention can be described with reference to several specific embodiments as set forth in FIG. 1 and FIG. 2. However, the general principal on which the energy efficient regeneration is based can best be described without reference to the overall flow scheme, but rather by description of the regeneration involved in an isolated adsorption bed. In this regard, in FIG. 3a–3, the regeneration sequence is set forth. A carbon dioxide adsorption bed at the end of the adsorption sequence is shown in FIG. 3a. The bed 110 is filled with an adsorbent 102, such as an X-zeolite. The bed also has a recuperator 104 consisting of a high heat capacity particulate material, such as copper pellets. Carbon dioxide laden gas is introduced through open valve 100 into the bed and the carbon dioxide is adsorbed on the zeolite. A carbon dioxide adsorption zone is illustrated in the bed. At least a part of the heat from a previous regeneration has been contained in the recuperator 104 by this advancing air stream. The carbon dioxide-depleted gas product is removed through the side line and open valve 108. The heat of the recuperator 104 is retained in the adsorption bed 110 because valve 106 is closed.

Figure 3A:
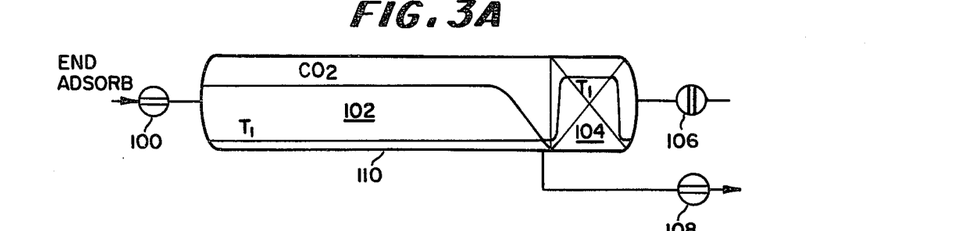
FIG. 3a is a schematic view of the carbon dioxide adsorption bed showing the movement of the carbon dioxide adsorption zone and the high temperature thermal zone at the end of an adsorption step.
Figure 3B:
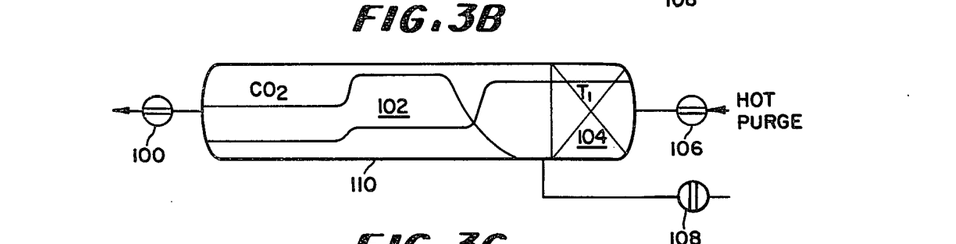
FIG. 3b is a schematic of the carbon dioxide adsorption bed in the heated purge stage showing the advancing thermal zone.

In the next sequence as shown in FIG. 3b, valve 108 is closed and an externally heated purge gas, which does not have any significant level of water or carbon dioxide, is admitted through now open valve 106 such that is passes through the recuperator 104 and the adsorption bed 102 countercurrently to the adsorption flow. The hot purge gas picks up the heat from the recuperator and provides a thermal zone that passes through the adsorbent 102 in the bed 110. The high temperature purge gas desorbs the adsorbed carbon dioxide from the adsorbent material, as the front of the thermal zone advances countercurrently in the bed 110. Front is used herein to denote the proximate border of the zone.

Figure 3C:
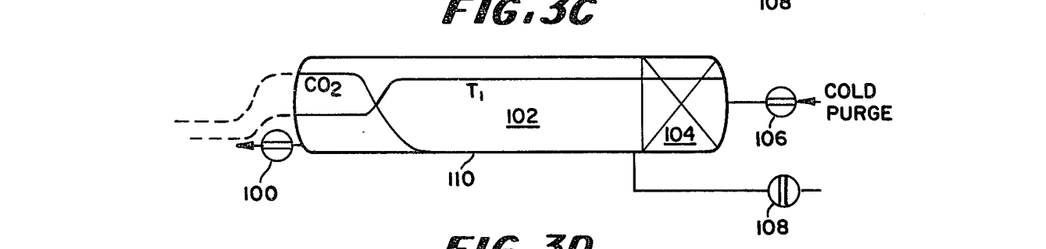
FIG. 3c is a schematic of the carbon dioxide adsorption bed at the beginning of the second or unexternally heated portion of the purge stage wherein the thermal zone has approached the feed end of the bed.
Figure 3D:
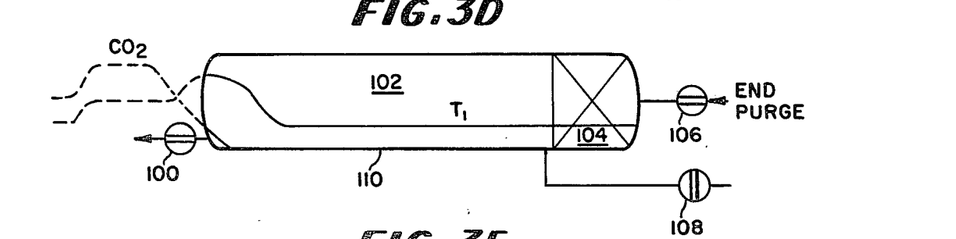
FIG. 3d is a schematic of the carbon dioxide adsorption bed at the end of all purging, showing the position of the thermal zone.

Continuing with the purge cycle in FIG. 3c, after a set period of hot purge, the externally supplied heat is switched off and the purge continues pushing the thermal zone through the adsorbent material 102. The purge is transmitted as the front or forward end of the thermal zone approaches the feed end of the bed 110 as shown in FIG. 3d. By using a hot purge gas stream only to create a thermal zone of high temperature in the adsorbent to desorb the carbon dioxide and then moving this zone of high temperature through the desorbing bed with a non-externally heated purge gas stream, significant energy reduction can be made in the regeneration cycle.

Additionally, by terminating the purge at approximately the time when the front of the thermal zone approaches the feed end of the adsorption column as in FIG. 3d, the heat loss is minimized.

Figure 3E:
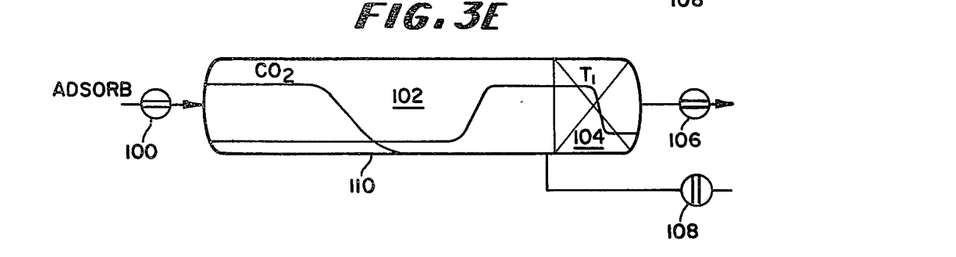
FIG. 3e is a schematic of the carbon dioxide adsorption bed during the adsorption stage wherein the thermal zone is passing into the recuperator.

Rather than cooling the entire bed before adsorption is reinitiated, as is done in the prior art, in the present invention, as shown in FIG. 3e, adsorption is started again, without a bed cooling step, with the high temperature thermal zone still in the adsorption bed 110 in the adsorbent material 102. Carbon dioxide-containing feed gas is introduced through open valve 100 and forces the high temperature thermal zone of regenerating gas back into the recuperator 104. The heat of regeneration is saved for another regeneration cycle by its adsorption and containment in the recuperator 104. After the front of the high temperature thermal zone passes into the recuperator 104 as sensed by temperature sensors in the bed, the valve configuration as shown in FIG. 3e is then changed to the configuration as shown in FIG. 3a and carbon dioxide adsorption is continued through another cycle.

Although the sequence in FIG. 3a–e is shown for illustration as having a distinct carbon dioxide adsorption zone and a distinct thermal zone, these attributes are used only for illustration of the principle of the invention, and the inventors do not wish to be held to the particular physical state of the adsorption zones or the high temperature thermal zone. Specifically, "high temperature" is used in the context of a temperature sufficiently elevated above ambient adsorption bed conditions to effect desorption of carbon dioxide.

Although the improvement of the present invention is primarily affected in the carbon dioxide adsorption section of a feed gas stream system, the preferred embodiments of the invention set forth below will be described in combination with a water adsorption scheme because of the various combinations of purge streams and the recovery of heat from an effluent purge stream from the carbon dioxide adsorption bed prior to passage to the water adsorption scheme by heat exchange of said stream with another purge gas stream entering the carbon dioxide adsorption section. Such a preferred embodiment is shown in FIG. 1. The system is comprised of a pressure swing adsorption section which removes water from a feed gas stream and a temperature swing adsorption section which removes carbon dioxide from the water-depleted feed gas stream. The improved regeneration occurs in this latter section.

Figure 1:
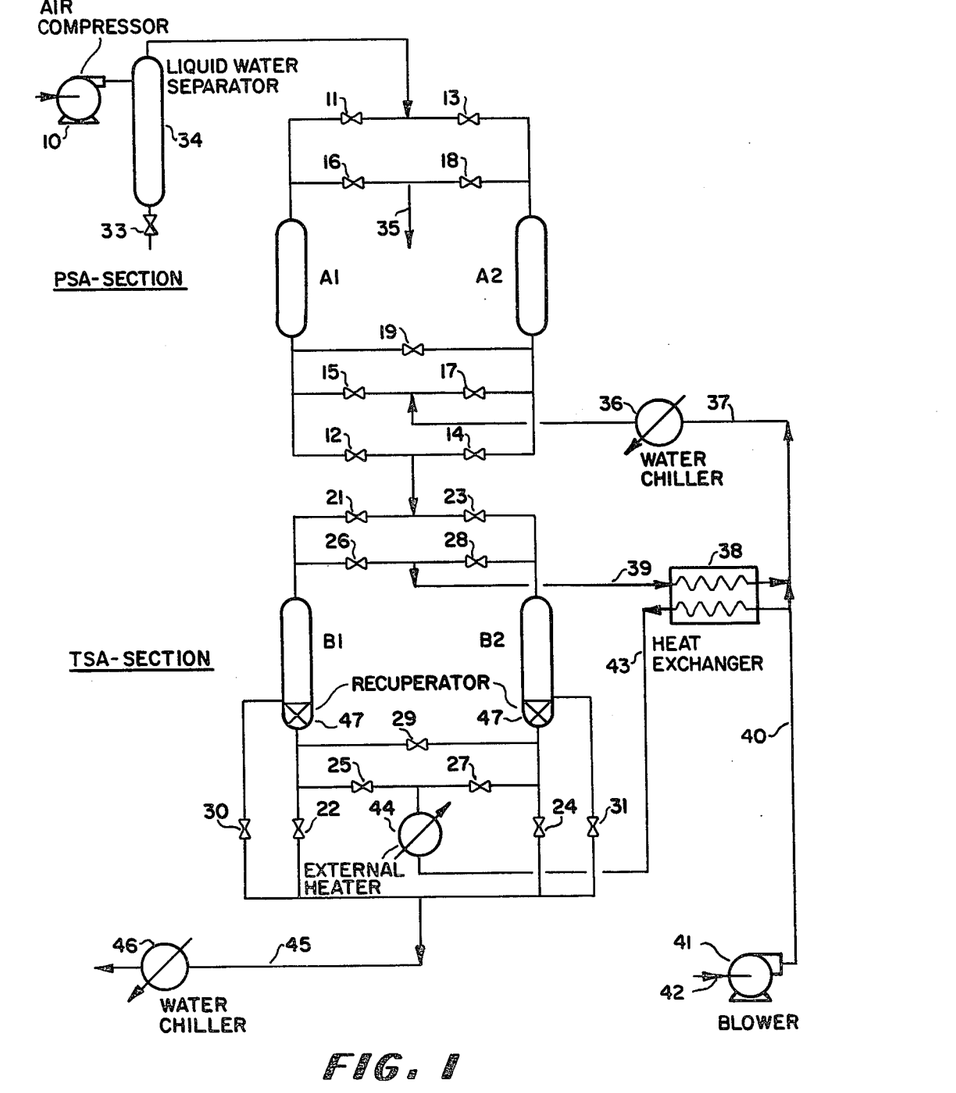
FIG. 1 is a flow scheme of one embodiment of the carbon dioxide adsorption and regeneration method of the present invention.

In FIG. 1, a feed air stream, which is saturated with water and which contains up to approximately 350 ppm of carbon dioxide enters the air compressor 10 where it is compressed to a pressure of between 50 and 150 psia, preferably 100 psia. The feed air stream is at a temperature in the range of 40° to 150° F., preferably 100° F. Condensed water is removed in adsorbent separator column 34. The water is removed through open valve 33. The feed air stream then continues through the main feed line and typically enters the first of two switching beds A1 through open valve 11. The feed air stream is depleted of water in adsorption bed A1 and discharges its water-depleted effluent through valves 12 and 21 into carbon dioxide adsorption bed B1. The water adsorption is continued until a predetermined time, such as when the water level in the effluent from the bed A1 is approximately one part per million. At this point, the bed is considered spent and the feed air stream is switched through valve 13 to a second bed A2. Valve 11 is closed and the bed A1 is depressurized through open valve 16 and line 35 to approximately 15 psia.

The bed is purged by flowing a water-depleted gas from the downstream equipment countercurrently back through the bed at a temperature in the range of 40° to 150° F. and a pressure of 15 psia. The countercurrent purge gas flow is continued for a predetermined time until the bed reaches a desired level of water desorption. The bed is then repressurized with water-depleted effluent from bed A2 through open valve 19. While bed A1 has been regenerated, bed A2 is in an adsorption stage. The beds are switched back and forth from these alternating stages of adsorption and regeneration. Alternately, one could contemplate a plurality of beds in alternating sequence of operation. A preferred time span of operation for the paired beds A1 and A2 is given in Table 1. These times are exemplary only.

TABLE 1

| Time (Seconds) | Bed Performance of the PSA Section | |
|---|---|---|
| | Bed A1 | Bed A2 |
| 0–15 | Adsorption | Depressurization |
| 15–285 | Adsorption | Purge |
| 285–300 | Adsorption | Pressurization |
| 300–315 | Depressurization | Adsorption |
| 315–585 | Purge | Adsorption |
| 585–600 | Pressurization | Adsorption |

The water-depleted feed air stream from the pressure swing adsorption section is delivered typically to bed B1 through open valve 21 where adsorption of carbon dioxide from the stream occurs. The water and carbon dioxide-depleted gas product from the bed B1 is delivered through open valve 22 to line 45 and water chiller 46. This product gas, depleted of water and carbon dioxide, can now be used in a downstream system, such as a cryogenic air distillation plant. During the initial adsorption in bed B1, the feed stream passes through the recuperator 47 at the downstream end of the bed. The carbon dioxide adsorption section is run in a temperature swing mode wherein high temperature is used to desorb carbon dioxide from the adsorbent after an adsorption step and such heat from the high temperature desorption is retained in the bed. As the feed stream passes through the bed in the adsorption mode, the heat is collected to a great extent in the recuperator 47. When a significant portion of the heat has been removed from the adsorption portion of the bed B1 as indicated by attaining a predetermined lower temperature at temperature sensors at the feed end of the recuperator 47, the valve 22 is closed and the carbon dioxide-depleted gas product from the bed B1 is then removed through valve 30. In this manner, the heat of regeneration is retained in the recuperator 47 and is not lost through the discharge of product from the bed or by a bed cooling step. The carbon dioxide adsorption is continued until a predetermined time or a predetermined level of carbon dioxide is sensed in the gas product from the bed, preferably a level less than one part per million of carbon dioxide. The bed is now considered spent because it has exhausted the desired capacity for removing carbon dioxide from the feed stream to the preferred level.

Valve 21 is closed and valve 23 is opened so that the adsorption of carbon dioxide from the water-depleted feed stream may continue in a continuous manner through bed B2. The spent bed B1 is depressurized by opening valve 26 which exhausts the water-depleted gas from bed B1 countercurrently through line 39 and heat exchanger 38 to be utilized as purge gas in line 37, after chilling in water chiller 36, for the water adsorption zone utilizing a pressure swing adsorption mode. The bed B1 is depressurized countercurrently to approximately 15 psia. The bed B1 is then purged countercurrently to the initial adsorption flow with a water and carbon dioxide-depleted gas stream from a blower 41 which is introduced through line 40, heat exchanger 38 and line 43. Alternately, if purge gas is available at 2-3 psig pressure, the blower 41 will not be necessary. The heat exchanger warmed gas in line 43 is further heated in external heater 44 before being introduced through open valve 25 into the recuperator end 47 of the bed B1. The water and carbon dioxide-depleted gas stream from the blower 41 can be from any source, but in the case of the utilization of this system in a cryogenic air distillation system, the gas stream introduced into the blower 41 in line 42 can be the waste stream from such a distillation system. For instance, when oxygen is the desired end product of the distillation, an inert nitrogen waste stream may be utilized as the feed to line 42. Alternately, in the instance of nitrogen being the desired product stream from such a cryogenic distillation system, an oxygen waste stream may be introduced into line 42.

The purge stream is introduced into bed B1 countercurrently at a pressure of 15 psia and a temperature of between 150° and 500° F. preferably 200° to 220° F. The heated purge gas causes the rapid desorption of carbon dioxide from the adsorbent in the bed B1. The adsorbed gas from the adsorption step in B1 is forced out of the feed end of the bed B1 as the hot purge gas enters the bed. This initial purge effluent from the front end of the bed B1 is passed through open valve 26 into line 39 where it is recycled to the pressure swing adsorption section as a purge gas for a regenerating bed, either A1 or A2 depending upon the cycle either bed is in. Any significant level of heat contained in this purge gas is recovered in the heat exchanger 38 before the purge gas is mixed with additional gas from blower 41 in line 40.

The external purge gas heater 44 is turned off after a preset period of purge duration and the purge gas flow through bed B1 is continued with only recovered heat from the exchanger 38 and the recuperator 47. The purge gas is continued until the thermal zone which has formed in the heat capacity material of the recuperator 47 and the adsorbent in the bed B1 is shifted to the feed end of the bed B1. At this point, the purge gas flow is terminated by the closing of valve 25, and the heat content of the purge gas is retained in the regenerated adsorbent in bed B1.

Valve 29 is opened to allow water and carbon dioxide-depleted gas product from bed B2 to enter and pressurize bed B1 countercurrently. The bed is brought up to a pressure of approximately 50 to 150 psia, specifically the pressure level of the operation of the rest of the adsorption system. The bed B1 is now ready to go back on-line as an adsorption bed in its adsorption stage. Bed B2 is then taken off-line by the closing of valve 23 and is regenerated in a manner similar to what has been described above for bed B1. Bed B1 is brought back on-line by the opening of valve 21. It will be noted that in the described operation, the heat used for regeneration of bed B1 has not been lost to any significant degree from bed B1 during the purge stage. A cold purge to return the bed to adsorption temperature conditions has not been utilized, which cold purge would also cause the loss in heat value from the hot purge stage. As the bed B1 goes back on-line, the initial flow of feed air will force the thermal zone in the adsorbent material back to the recuperator 47 where the high heat capacity packing in the recuperator will recover and save a large portion of that heat for the ensuing regeneration stage. In this way, during any given regeneration of the temperature swing adsorption stage where carbon dioxide is adsorbed from the feed gas stream, the amount of external energy needed to supply heat for the purge stage of the adsorption section is greatly reduced. The energy saving is also brought about by the retention of a major portion of the thermal zone in the adsorbent bed during regeneration so that a significant amount of heat is not lost out of the feed end of the bed as in prior art regeneration cycles. Any minor portion of the heat which does happen to be lost in the purge stream emanating from the front end of the bed is at least partially recovered in the heat exchanger 38.

Figure 2:
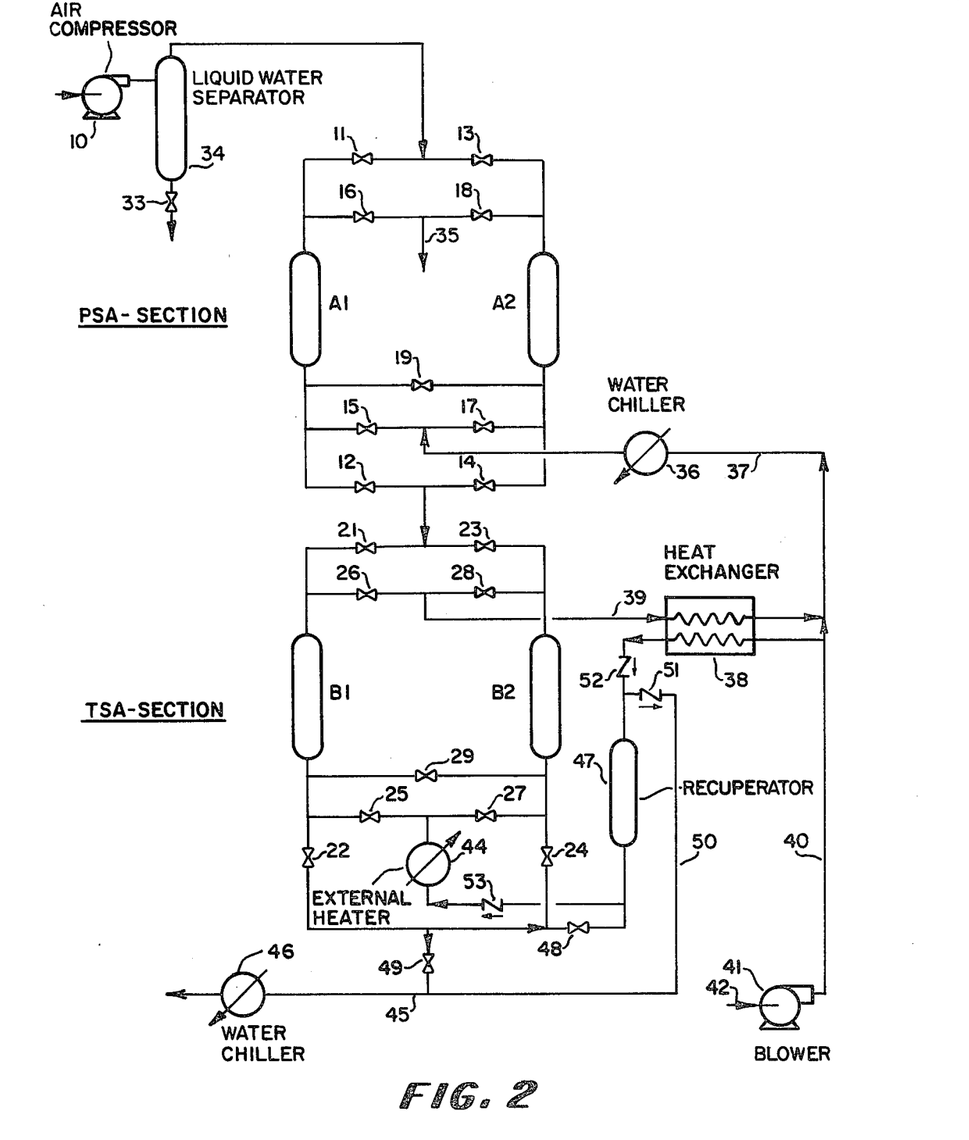
FIG. 2 is an alternate embodiment of the flow scheme for a carbon dioxide adsorption and regeneration method of the present invention.

FIG. 2 illustrates a second preferred embodiment of the present invention wherein a single recuperator is utilized to recover the heat of the high temperature purge of the carbon dioxide adsorbing beds, rather than having an individual recuperator for each of the beds. The upstream sequence of adsorption and desorption for the pressure swing adsorption section for water removal and the initial feed to the temperature swing adsorption section for carbon dioxide removal are the same as in FIG. 1. However, when the carbon dioxide adsorbing beds are taken off-line for regeneration, a slightly different sequence of process steps is performed. Initially, adsorption occurs for the water-depleted feed gas stream through open valve 21 and adsorbent bed B1. The water and carbon dioxide-depleted gas product stream exits bed B1 through open valve 22, open valve 48, recuperator 47, check valve 51, and lines 50 and 45. Preferably, the gas product stream is cooled in water chiller 46 prior to use in a downstream installation, such as a cryogenic air distillation system. After a predetermined period of time or a predetermined low temperature is sensed in the effluent from bed B1, the valve 48 is closed and valve 49 is opened. In this manner, the adsorption stage can continue by bypassing the recuperator 47 and retaining the regeneration heat in the recuperator. The adsorption stage is continued in bed B1 until a predetermined time or a predetermined level of carbon dioxide is found in the effluent, preferably below one part per million of carbon dioxide.

At this point, valve 21 is closed and bed B1 is taken off-line while valve 23 is opened and bed B2 is brought on-line for its adsorption stage. Bed B1 is depressurized countercurrently through open valve 26 and line 39. This depressurizing gas is mixed with water and carbon dioxide-depleted gas from blower 41 and the combined streams in line 37 are used as purge gas in the pressure swing adsorption section. Depressurization is continued until the desired end pressure, which is approximately 15 psia. Bed B1 is then purged countercurrently with a carbon dioxide and water-depleted gas available from the blower 41 in line 40. Alternately, if purge gas is available at 2-3 psig of pressure, the blower 41 will not be necessary. The gas is heated to a lower, elevated temperature in heat exchanger 38 before passing through check valve 52 and gaining additional heat in recuperator 47. The gas, at an intermediate elevated temperature, passes through check valve 53 and external heater 44 wherein it is elevated to a temperature in the range of approximately 200° to 500° F. This heated purge gas passes through open valve 25 into the adsorption bed B1. The elevated temperature purge gas desorbs carbon dioxide from the adsorbent in a countercurrent flow. The desorbed carbon dioxide is removed from the feed end of bed B1 through open valve 26 and line 39. A significant amount of any heat which is lost through the effluent in line 39 is at least partially recovered in heat exchanger 38 before passing with gas from blower 41 as purge gas to the pressure swing adsorption section. The external heater 44 is turned off after only a portion of the purge stage is completed. Preferably, the heater is turned off after a substantial high temperature thermal zone exists in the adsorbent bed B1. This high temperature thermal zone is then moved through the adsorbent bed countercurrently by an ambient condition purge gas stream. The purge is discontinued when the front of the zone is approximately at the feed end of the adsorbent bed. Valve 26 is closed and valve 29 is opened in order for the bed B1 to be repressurized with water and carbon dioxide-depleted gas product from bed B2. Bed B1 is now ready to go on-line, and bed B2 is ready to go off-line for regeneration. This sequence of switching adsorption and regeneration stages is continued indefinitely in order to provide a continuous flow of water and carbon dioxide-depleted gas product for a subsequent use. The preferred bed performance times for each stage of a given adsorption purge and depressurization stage is given in Table 2 below. These are preferred operational times and the invention is deemed to be contemplated for times which may vary from this preferred time. This table is for the operation of the carbon dioxide adsorption section only, which is operated as a temperature swing adsorption process.

TABLE 2

| Time (Minutes) | Bed Performance of the TSA Section | |
|---|---|---|
| | Bed B1 | Bed B2 |
| 0–25 | Adsorption | Depressurization |
| 25–75 | Adsorption | Hot Purge |
| 75–220 | Adsorption | Purge |
| 220–240 | Adsorption | Pressurization |
| 240–265 | Depressurization | Adsorption |
| 265–315 | Hot Purge | Adsorption |
| 315–460 | Purge | Adsorption |
| 460–480 | Pressurization | Adsorption |

Although a description of the operation of both the water adsorbing pressure swing adsorption section and the two embodiments of the carbon dioxide adsorbing temperature swing adsorption sections have been set forth above, not all of the valve operations were recited for purposes of brevity and clarity. In order to provide a precise indication of the operation of the various embodiments of the present invention, the complete sequence of valve operations are given in Table 3 which is directed to the pressure swing adsorption section and Tables 4a and 4b which are directed to the FIG. 1 embodiment and the FIG. 2 embodiment, respectively.

TABLE 3

| Time (Seconds) | Valve Positions for the PSA Section | | | | | | | | |
|---|---|---|---|---|---|---|---|---|---|
| | Valve Number | | | | | | | | |
| | 11 | 12 | 13 | 14 | 15 | 16 | 17 | 18 | 19 |
| 0–15 | O | O | C | C | C | C | C | O | C |
| 15–285 | O | O | C | C | C | C | O | O | C |
| 285–300 | O | O | C | C | C | C | C | C | O |
| 300–315 | C | C | O | O | C | O | C | C | C |
| 315–585 | C | C | O | O | O | O | C | C | C |

TABLE 3-continued

| Time (Seconds) | Valve Positions for the PSA Section | | | | | | | | |
|---|---|---|---|---|---|---|---|---|---|
| | Valve Number | | | | | | | | |
| | 11 | 12 | 13 | 14 | 15 | 16 | 17 | 18 | 19 |
| 585–600 | C | C | O | O | C | C | C | C | O |

TABLE 4(a)

Recuperator Inside the TSA-Section Beds (FIG. #1)
Valve Positions for the TSA-Section

| Time (Minutes) | Valve Number | | | | | | | | | | |
|---|---|---|---|---|---|---|---|---|---|---|---|
| | 21 | 22 | 23 | 24 | 25 | 26 | 27 | 28 | 29 | 30 | 31 |
| 0–8 | O | O | C | C | C | C | C | O | C | C | C |
| 8–25 | O | C | C | C | C | C | C | O | C | O | C |
| 25–220 | O | C | C | C | C | C | O | O | C | O | C |
| 220–240 | O | C | C | C | C | C | C | C | O | O | C |
| 240–248 | C | C | O | O | C | O | C | C | C | C | C |
| 248–265 | C | C | O | C | C | O | C | C | C | C | O |
| 265–460 | C | C | O | C | O | O | C | C | C | C | O |
| 460–480 | C | C | O | C | C | C | C | C | O | C | O |

TABLE 4(b)

Recuperator in a Separate Vessel (FIG. #2)
Valve Positions for the TSA-Section

| Time (Minutes) | Valve Number | | | | | | | | | | |
|---|---|---|---|---|---|---|---|---|---|---|---|
| | 21 | 22 | 23 | 24 | 25 | 26 | 27 | 28 | 29 | 48 | 49 |
| 0–8 | O | O | C | C | C | C | C | O | C | O | C |
| 8–25 | O | O | C | C | C | C | C | O | C | C | O |
| 25–220 | O | O | C | C | C | C | O | O | C | C | O |
| 220–240 | O | O | C | C | C | C | C | C | O | C | O |
| 240–248 | C | C | O | O | C | O | C | C | C | O | C |
| 248–265 | C | C | O | O | C | O | C | C | C | C | O |
| 265–460 | C | C | O | O | O | O | C | C | C | C | O |
| 460–480 | C | C | O | O | C | C | C | O | C | C | O |

The beds which are used for the adsorption of water in a pressure swing mode preliminary to the carbon dioxide adsorption can be packed with any adsorbent which selectively removes water from a gas, such as air. The key adsorptive properties are high working capacity under pressure swing adsorption conditions, low heat of adsorption and fast kinetics. Adsorbents which meet these criteria are typically alumina and silica gel.

The adsorbents which are utilized in the beds of the carbon dioxide adsorption section which is run in a temperature swing adsorption mode can constitute any adsorbent which selectively removes dilute carbon dioxide from a gas, such as air. The key adsorptive properties for selecting such an adsorbent are high capacity, low heat of adsorption, fast adsorption kinetics and high selectivity for dilute carbon dioxide. Exemplary of typical adsorbents which meet these criteria are the 5A, 13X and calcium X zeolites. Additionally, sodium mordenite and other ion exchanged mordenite molecular sieves may be utilized. Other ion exchanged zeolites can be used.

Both the adsorbents for the water adsorption and the carbon dioxide adsorption should additionally have the desired properties of high crush strength, high attrition resistance, large bulk density, low interparticle void, high heat capacity and large thermal conductivity.

The pressure drop through the adsorbent bed is also important in considering the selection of an adsorbent and is an important criteria in determining the particular adsorbent particle size. In addition to the preferred adsorbents and the criteria for their selection, the present invention has as an essential element of its operation the use of an integral recuperator or a remote recuperator. The recuperator must have a packing material which has high heat capacity, high thermal conductivity, high bulk density and high attrition resistance. Typical high heat capacity materials which may be used in the recuperators are copper, iron and silicious materials, such as small pebbles or stones of a graded size.

The method of operation of the present invention enjoys several advantages over the prior art methods for the removal of carbon dioxide from a feed air stream. The improvements of the present invention incorporate the omission of a cooling step subsequent to thermal regeneration and before the start up of a new adsorption cycle. A substantial portion of the regeneration heat is left in the adsorbent bed for subsequent recovery and storage in a recuperator during the adsorption step. This is contrary to the practice of the prior art wherein a cooling purge is necessary to return the bed to ambient conditions prior to an adsorption stage start up. In the present invention, the recovery and storage of this heat enables an energy reduction to be achieved during the ensuing regeneration stage wherein the recovered heat assists the hot purge gas for desorbing the adsorbed carbon dioxide from the adsorbent media of the bed undergoing regeneration.

A further improvement which is incorporated in the method of the present invention is that at least a portion of the regeneration purge is performed with the absence of externally supplied heat. In contrast to the prior art in which an extended period of hot purge is necessary, the present invention uses only a short period of externally supplied heat to regenerate the adsorption bed. This external heat requirement is assisted by the recovered heat in the recuperator. After the externally supplied heat is turned off, a recovered heat purge which is heated by heat exchange and by residual heat in the recuperator continues an elevated temperature purge. A designed cooling of the bed is not performed.

Finally, a further improvement which is incorporated in the present invention is the heat exchange of the incoming purge gas stream against the outgoing purge effluent in order to recover as much lost heat as possible for the continued regeneration of the carbon dioxide adsorbent beds.

The present invention, by using these advantages in heat conservation, is successful in reducing the energy requirements of the front end clean up system comprised of the pressure swing adsorption of water and the temperature swing adsorption of carbon dioxide by approximately 85% as compared with the conventional TSA system, exemplified by a water and carbon dioxide clean up scheme for air wherein both the water and the carbon dioxide are removed from air in adsorbent beds which are regenerated in a temperature swing manner, and by approximately 40% as compared with the pressure swing adsorption/temperature swing adsorption system of U.S. Pat. No. 4,249,915. Despite the reduction in energy for regeneration, the product recovery of water and carbon dioxide-depleted gas product is high in the present invention. This comparison of the various prior art systems against the system of the present invention was made for a feed stream necessary to supply at 170 standard tons of oxygen per day air separation plant. The reactivation gas requirement of the present invention is approximately 22.1% of the feed. This is above a comparable requirement for a conventional temperature swing adsorption front end clean up system of approximately 15.5%. The reactivation gas requirement of U.S. Pat. No. 4,249,915 is approximately 22.1%. The comparable energy requirements for the various prior art systems and the present invention are set forth in Table 5 below in greater detail.

TABLE 5

| | Energy Requirement in BTU/hr $\times 10^{-6}$@ | | |
|---|---|---|---|
| | Conventional TSA | PSA/TSA* | Present Invention |
| Main Chiller | 0.35 | — | — |
| Regeneration Heater | 0.51 | 0.14 | 0.05 |
| Void Loss | — | 0.08 | 0.08 |
| Total | 0.86 | 0.22 | 0.13 |
| $\frac{\text{Reactivation Gas}}{\text{Feed Air}} \times 100$ | 15.5% | 22.1% | 22.1% |

*U.S. Pat. No. 4,249,915.
@For a plant capacity of 170 ST O$_2$/day.

The present invention has been set forth in two preferred embodiments, but it is deemed to be within the skill of those in the art to make various modifications from the present invention as specifically described or to treat gas streams other than air. These modifications are deemed to be within the scope of the present invention which should be ascertained from the claims which follow.

We claim:

1. In a process for removing carbon dioxide from a gas stream in an adsorbent bed by temperature swing adsorption comprising flowing a water-depleted gas feed stream containing carbon dioxide through said bed to selectively adsorb carbon dioxide, the improvement comprising the steps of:
   (a) passing the carbon dioxide-depleted gas product of the adsorbent bed through a recuperator to retain heat from said adsorbent bed;
   (b) bypassing the flow of carbon dioxide-depleted gas product around said recuperator after the gas reaches a predetermined lower temperature level, but while continuing the adsorption;
   (c) discontinuing the flow of water-depleted feed gas through said bed when the gas product of said bed reaches a predetermined level of carbon dioxide;
   (d) reducing the pressure of the bed and initiating the purging of the bed countercurrently with a heated water and carbon dioxide-depleted purge gas, which is heated to an elevated temperature by externally supplied heat and heat recovered from said recuperator until a thermal zone exists in said bed;
   (e) continuing the purge of the adsorbent bed without externally supplied heat until the thermal zone in said bed is approximately at the feed end of the bed;
   (f) discontinuing the flow of purge gas, and
   (g) repressurizing the bed countercurrently with water and carbon dioxide-depleted gas until the bed reaches a preset pressure level such that the adsorption cycle can be initiated again.

2. The process of claim 1 wherein the water-depleted feed gas stream is introduced into the adsorbent bed at 50–150 psia.

3. The process of claim 2 wherein the water-depleted feed gas stream is introduced into the adsorbent bed at 40°–150° F.

4. The process of claim 3 wherein the adsorption is discontinued when the gas product obtains a carbon dioxide level of up to 1 PPM.

5. The process of claim 1 wherein a plurality of adsorbent beds are utilized in which at least one bed is an adsorption mode while at least one other bed is in a regeneration mode.

6. The process of claim 5 wherein the water-depleted feed gas stream is delivered from a plurality of switching pressure swing adsorption beds.

7. The process of claim 6 wherein the water-depleted gas feed stream is air.

8. The process of claim 6 wherein the water and carbon dioxide-depleted gas product is supplied to an air separation system to recover oxygen and or nitrogen.

* * * * *